UNITED STATES PATENT OFFICE.

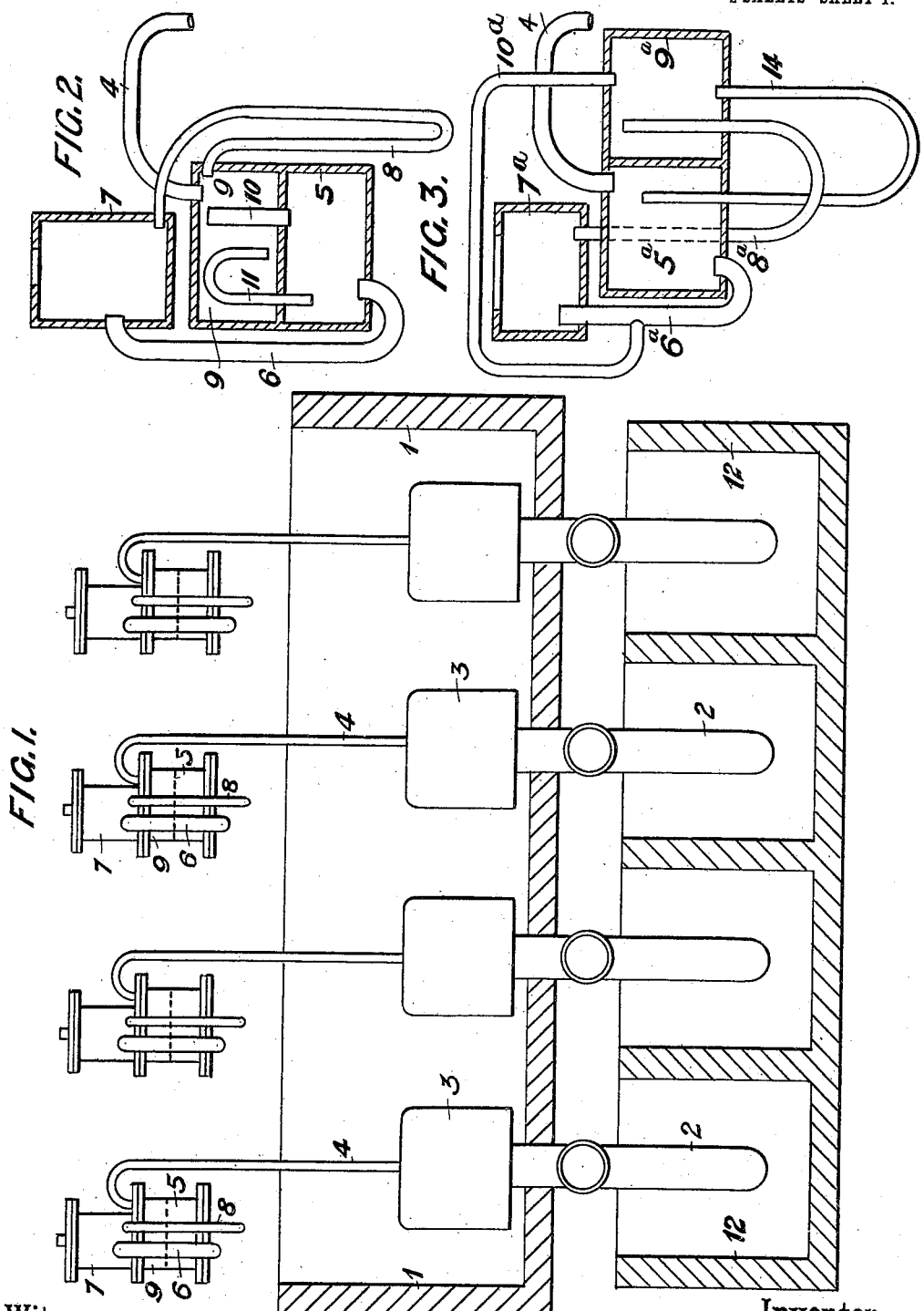

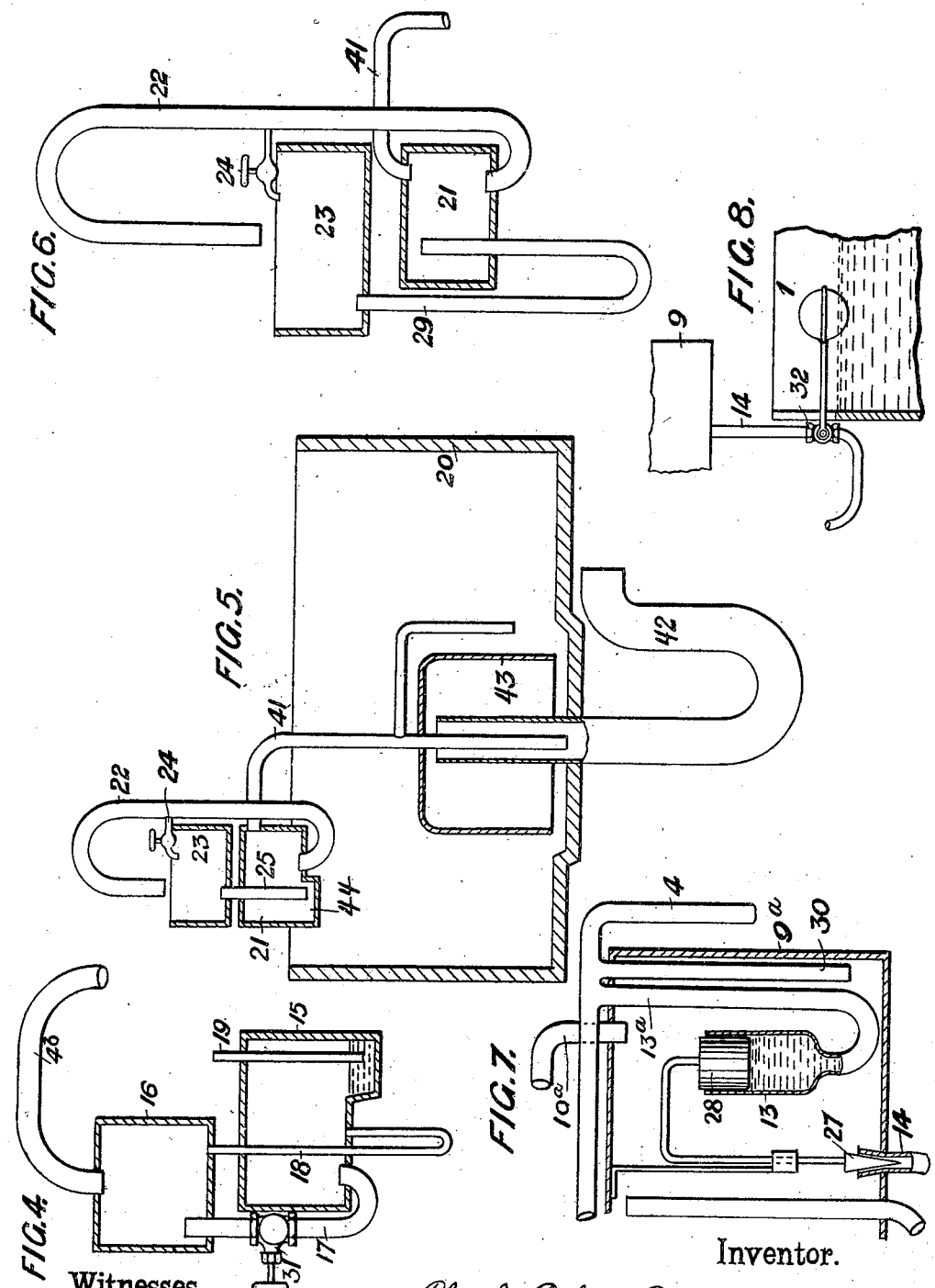

CHARLES ROBERT BARRINGTON BROWN, OF LONDON, ENGLAND.

APPARATUS FOR DISCHARGING LIQUIDS FROM AND TO FILTER-BEDS, &c.

No. 922,386.    Specification of Letters Patent.    Patented May 18, 1909.

Application filed May 1, 1908.    Serial No. 430,361.

*To all whom it may concern:*

Be it known that I, CHARLES ROBERT BARRINGTON BROWN, a subject of the King of Great Britain, residing at 106 Vartry road, Stamford Hill, London, England, have invented certain new and useful Improvements in Apparatus for Discharging Liquids from and to Filter-Beds and other Receptacles, of which the following is a specification.

The object of these improvements is to provide suitable means for discharging in set sequence and at predetermined or set times the sewage or other liquid from or to a series of filter beds or other receptacles. For this purpose I connect the filter beds or other receptacles, hereinafter referred to as filter beds, to one common chamber wherein are fixed siphons, hereinafter called main siphons, one for each filter bed, and in connection with each main siphon I provide a controlling device the nature and operation of which will be hereinafter described with reference to the accompanying drawings of which—

Figure 1 shows four devices in connection with four siphons discharging from one common tank on to four filter beds. Fig. 2 is a more or less diagrammatic sectional elevation of one such controlling device. Fig. 3 is a similar view of another modification. Fig. 4 is a similar view of a modification adapted for regulating the duration of a siphonic discharge. Fig. 5 is a similar view of a modification as adapted to set the time of discharge from a filter bed, and Fig. 6 is a diagram of a different form of the last modification. Fig. 7 is a modification of the form illustrated in Fig. 3, showing a regulating valve in the siphon pipe controlled by suction in the rising pipe and Fig. 8 illustrates a modification of the regulating means shown in Fig. 7.

In Fig. 1 the tank 1 is a chamber or tank common to say four main siphons 2, each of which is connected to a controlling device shown separately in Fig. 2 in the following manner:—The usual dome 3 of each siphon connects by means of the rising pipe 4 with the upper part of a closed chamber 9, and the bottom of the chamber 9 communicates with a chamber 5 first by the straight pipe 10 and secondly by the siphon pipe 11. The chamber 5 communicates by a trapped pipe 6 with the lower part of an open vessel 7 placed at a higher level, the outlet or long leg of the pipe 6 terminating somewhat above the bottom of the vessel 7. The bottom of the open vessel 7 communicates by a trapped pipe 8 with the top of the closed chamber 9. The closed chamber 5 and the trapped pipe 6 and also the pipe 8 are charged with a liquid such as mercury or by preference with a non-drying oil which needs not to be frequently replenished because of gradual evaporation, as for instance would be the case with water or a watery liquid. The pipe 10 serves as a vent for equalizing the air pressure in chambers 5 and 9 while the small siphon pipe 11, when a sufficient amount of liquid has been delivered to the chamber 9, serves to return the oil from chamber 9 to chamber 5 and thus to re-set the apparatus for a fresh action. The filter beds 12 to which the siphons 2 discharge are shown below the common tank 1.

The action of the apparatus is as follows:— At the start the condition in the four controlling devices would be as follows:—Counting from the left hand of Fig. 1 No. 1 apparatus would have in its chamber 5 one quarter of the complete charge of oil with which it is designed to work and the chamber 9 would contain the other three quarters. Chamber 5 in No. 2 apparatus would contain half the said charge of oil, and chamber 9 the other half. Chamber 5 in No. 3 apparatus would contain three quarters of the said charge of oil and chamber 9 the other quarter. Chamber 5 in No. 4 apparatus would contain the complete charge of oil with which it is designed to work and chamber 9 would be empty. The discharge of a siphon takes place when all the oil has been forced by successive actions from chamber 5 and a clear passage is left from the chamber 9 through pipe 10 chamber 5 pipe 6 and chamber 7 which is open to the atmosphere. Thus one of the four apparatus viz., No. 1 is ready upon the next filling of the tank 1 to permit its siphon to discharge and the other three will be ready in their turn to discharge the tank contents to filter beds or other receptacles, drains or otherwise. I will now describe what takes place in No. 1 apparatus under the above conditions. The tank 1 being filled compresses the air in the dome 3 of the siphon 2 and the air pressure being transmitted by pipe 4 to the chamber 9 and thence to the chamber 5 drives the quarter charge of oil from the chamber 5 up the pipe 6 into the open vessel 7 which latter can contain about this quarter charge below the orifice of the pipe 6. Thus a clear way is left for the air to escape into the atmosphere, and the air pressure in the bell 3 being relieved the siphon 2 belonging to No. 1 apparatus will be set in action and discharge the tank 1. The oil in vessel 7 now descends by the pipe 8, joins the other three quarters of the charge already in chamber 9, and the level in the chamber 9 being now sufficiently high the siphon 11, will act and thus return practically all the oil in the chamber 9 to chamber 5. Meanwhile in the No. 2, No. 3 and No. 4 apparatus the air pressure in each of their siphons has moved the oil from the chamber 5 to the vessel 7. On the falling of the air pressure owing to the discharge of siphon No. 1 the oil returns from vessel 7 to chamber 5 except for the quantity amounting to about a quarter charge below the mouth of the pipe 6. This quantity passes by the trap pipe 8 to the chamber 9. No. 2 apparatus is now in the same condition as No. 1 was at the start, No. 3 is in the condition that No. 2 was at the start, No. 4 in the same condition as No. 3 was at the start, while No. 1 is in the same condition as No. 4 was at the start. It will thus be understood that each apparatus has to pass through the four aforesaid stages before it in its turn discharges the common chamber or tank 1. The number of stages in the action will be in accordance with the number of siphons and apparatus in the tank 1.

In the arrangement shown in Fig. 3 chambers $5^a$ and $9^a$ are placed side by side and the oil in the latter is returned to chamber $5^a$ by means of the trapped pipe 14; the suction created by the discharge of the main siphon 2 being sufficient to effect this action. The vent $10^a$ is shown connected to the trapped pipe $6^a$ and the chamber $9^a$ is vented to the atmosphere through the chamber $7^a$ until the air pressure in chamber $5^a$ forcing the oil up the pipe $6^a$ seals the mouth of the vent pipe $10^a$. The pipes $8^a$ and 14 always remain charged with non-evaporative liquid up to the level determined by the shortest leg of the said pipes $8^a$ and 14.

Fig. 4 shows an arrangement for regulating the period of duration of discharge by a siphon. In this construction a closed chamber 15 is used in connection with a closed chamber 16 the two being connected by a trapped pipe 17 and a trapped pipe 18. The chamber 15 is charged with non-evaporative liquid and the pipe 18 is for returning the oil from the chamber 16 to the chamber 15. A pipe 19 open to an air supply at atmospheric or greater pressure dips in a seal of mercury of shallow depth, which seal is forced by the suction created by the discharge of the siphon whose bell or dome is connected to the chamber 16 by the pipe $4^b$. When the siphon commences to discharge, a partial vacuum is created in the upper chamber 16 thus drawing the oil from chamber 15 to chamber 16 by way of the pipe 17 which is provided with a valve 31 for regulating the speed of the oil through it. Therefore by adjusting the speed of transfer of the liquid the length of time is regulated during which the siphon can discharge. The suction toward the end of the transfer has become sufficiently strong to rapidly draw the last of the oil through the pipe 17 to the chamber 16 and to reduce the pressure so far that the mercury seal is easily broken by the atmospheric or other pressure of air in the pipe 19. As soon as the seal is broken the air enters the chamber 15 and passes by pipe 17 to chamber 16 and thence to the siphon thus stopping the discharge thereof.

Fig. 5 shows apparatus connected directly to the dome 43 of a siphon 42 arranged in a filter bed 20. By means of this apparatus the commencement of discharging of the siphon 42 is timed, that is to say the siphon 42 is allowed to discharge for instance after the lapse of the proper time for treatment of matter in the filter bed 20. The pressure in the main siphon 42 comes by the pipe 41 upon the oil in chamber 21 and forces it a certain distance up a pipe 22. From the pipe 22 oil then gradually escapes by a tap 24 to the open vessel 23, the rate of escape being regulated by the tap, until finally after the desired lapse of time the column of oil in the pipe 22 is so lessened in height by the said escape that the air pressure in the chamber 21 overcomes the counter pressure due to head of liquid and empties the oil in the pipe 22 through the open end of the latter into the vessel 23. The compressed air locked in the main siphon 42 is now liberated and the said siphon 42 commences to discharge the filter bed 20. The oil in the open vessel 23 then returns to the chamber 21 by the pipe 25, which may dip into a shallow tray 44 containing mercury or this pipe may take the form of a trapped pipe 29 charged with oil as shown in Fig. 6 which shows a very similar construction to that shown in Fig. 5.

In Fig. 7 is shown a needle valve 27 suspended from a float 28 acting in a vessel formed on one end of a pipe $13^a$ which is arranged in the closed chamber $9^a$, which is the same chamber as that shown in Fig. 3. The pipe $13^a$ communicates with the pipe 4 which in Fig. 3 opens into the upper part of the closed chamber $5^a$. The needle valve 27 serves to regulate the opening to the pipe 14 which in Fig. 3 leads up to a certain distance or level of the oil in the closed chamber $5^a$, and this valve 27 thereby regulates the length of time required for the transit of the oil from the chamber $9^a$ to the chamber $5^a$ and therefore the time elapsing before a vent pipe 30 leading to the pipe 4 is uncovered by the fall in level of the liquid in the chamber $9^a$.

When the tank 1 commences to discharge, suction is at a minimum in the pipe 4 and the liquid in the vessel 13 is then at a comparatively high level, and, consequently the valve 27 is fully open, but when the level in the tank 1 drops owing to the continued siphonic discharge, the actual suction increases, the float 28 sinks, and the valve 27 gradually closes and the rate of flow from the chamber 9ª to the chamber 5ª is reduced. The vent pipe 30 serves to break the siphonic action of the main discharging siphon when the chamber 9ª has so far discharged its contents as to uncover the lower end of said pipe 30.

Fig. 8 shows an alternative viz., a ball cock 32, the ball of which may act in a separate cistern, or in the tank 1. This ball cock serves to regulate the speed of return flow of the oil from the closed chamber 9 to the closed chamber 5.

The devices described with reference to Figs. 6 and 7 are applicable as additional to the apparatus described with reference to Fig. 3, and fulfil a function similar to that of the device described with reference to Fig. 4.

By devices operating as above described it is possible to cause siphons to alternate or act in a desired sequence and at set times and for set periods for discharging from or to a filter bed, or from a tank common to a number of filter beds; it is also possible to discharge a given quantity from a tank independently of the supply thereto. It will be understood that the same non-evaporative liquid such as non-drying oil is used over and over again for succeeding operations and remains within the apparatus itself. The controlling action is not as heretofore usual, dependent upon any connection between each siphon and the vessel into which the sewage is discharged, or any connection between the siphons other than that of being disposed in one common chamber. By the improved apparatus the cost of the installation, is reduced and certainty of action insured.

What I claim and desire to secure by Letters Patent of the United States is:—

1. Apparatus for controlling the action of a siphon, comprising a chamber, a connection between said siphon and said chamber, a pipe circuit leading from and returning to said chamber said pipe circuit being adapted to communicate with the atmosphere at one point, and a liquid adapted to circulate through said chamber and said pipe circuit partly under the action of the change of pressure in said siphon and partly under the influence of gravity for the purpose set forth.

2. Apparatus for controlling the action of a siphon comprising a duct communicating with said siphon, and a liquid circuit in connection with said duct the liquid of which circuit is adapted to normally seal said duct and to traverse said circuit under the influence of variation of pressure in said siphon to unseal and subsequently reseal said duct.

3. Apparatus for controlling the action of a siphon comprising a liquid circuit the liquid of which is placed under the influence of pressure variations in said siphon and is caused thereby to perform its circuit and to automatically unseal and reseal communication between said siphon and the atmosphere.

4. Apparatus for controlling the action of a siphon, comprising a chamber, a connection between said siphon and said chamber, a pipe circuit leading from and returning to said chamber, a second chamber inserted in said pipe circuit and adapted to have communication with the atmosphere, and a liquid adapted to circulate through said chambers and said pipe circuit to alternately seal and unseal communication between the first named chamber and the outer air for the purpose set forth.

5. Apparatus for controlling the action of a siphon comprising a chamber, a connection between said siphon and said chamber, a pipe circuit leading from and returning to said chamber and adapted to have communication with the atmosphere, a liquid trap in said pipe circuit, and a liquid adapted to circulate through said chamber and said pipe circuit and to normally seal said trap substantially as set forth.

6. Apparatus for controlling the action of a siphon comprising closed chambers, a connecting duct between one of said chambers and said siphon, a pressure equalizing duct connecting said chambers, an open chamber, a trapped pipe connection between one of said closed chambers and said open chamber, a duct connecting said open chamber with the other of said closed chambers, a liquid adapted to flow through said chambers and said ducts in the order named, under the influence of pressure variations in said siphon, and means adapted to intermittently empty said other closed chamber to the first named closed chamber substantially as set forth.

7. Apparatus for controlling the action of a siphon comprising a liquid circuit the liquid of which is placed under the influence of pressure variations in said siphon and is caused thereby to perform its circuit, and means adapted to govern the transference of liquid from one part of the circuit to another whereby the time occupied in the complete circuit of the liquid for automatically effecting the unsealing and resealing of a communication between the siphon and the atmosphere can be adjusted as required.

In testimony whereof I affix my signature in presence of two witnesses.

CHARLES ROBERT BARRINGTON BROWN.

Witnesses:
F. L. RAND,
R. WILLIAMS.